United States Patent [19]

Strausfeld

[11] Patent Number: 4,496,300
[45] Date of Patent: Jan. 29, 1985

[54] DISC RECORD PRESS FORMING

[75] Inventor: Hermann Strausfeld, Cologne, Fed. Rep. of Germany

[73] Assignee: Emi Electrola Gesellschaft mit beschrankter Haftung, Cologne, Fed. Rep. of Germany

[21] Appl. No.: 486,885

[22] Filed: Apr. 20, 1983

[30] Foreign Application Priority Data

Apr. 21, 1982 [GB] United Kingdom ............... 8211533

[51] Int. Cl.³ .............................................. B29D 17/00
[52] U.S. Cl. .................................. 425/408; 249/141; 264/107; 425/810; 425/812
[58] Field of Search ............... 249/141; 425/810, 812, 425/408; 264/107

[56] References Cited

U.S. PATENT DOCUMENTS

| 2,615,203 | 10/1952 | DuPree | 425/812 |
| 2,975,481 | 3/1961 | Kauffman | 425/812 |
| 2,976,571 | 3/1961 | Moslo | 249/141 |
| 3,341,647 | 9/1967 | Aberle | 425/812 |
| 4,027,726 | 6/1977 | Hodler | 425/812 |
| 4,085,178 | 4/1978 | McNeely | 425/810 X |
| 4,379,686 | 4/1983 | Chambers et al. | 425/810 |

FOREIGN PATENT DOCUMENTS

| 901747 | 7/1962 | United Kingdom . |
| 1115846 | 5/1968 | United Kingdom . |
| 1323343 | 7/1973 | United Kingdom . |
| 1328872 | 9/1973 | United Kingdom . |

OTHER PUBLICATIONS

Article entitled "Molding Records Automatically" by J. C. Ruda, (pp. 24–29).

Primary Examiner—Jay H. Woo
Assistant Examiner—James C. Housel
Attorney, Agent, or Firm—Fleit, Jacobson, Cohn & Price

[57] ABSTRACT

Stamper plates and backing plates in a tool for the pressing of video discs are recessed to permit the formation of an annular ridge which encircles the information region of a disc and is provided for use in the mechanical removal of a disc from its container. Apertures in an annular recess in a stamper plate are aligned with apertures in the associated backing plate to lead to a manifold which communicates with atmosphere. Air which may be present in the ridge of plastics material during the pressing operation thereby escapes to atmosphere, and blemishes in the ridge due to air entrapment are substantially avoided.

5 Claims, 1 Drawing Figure

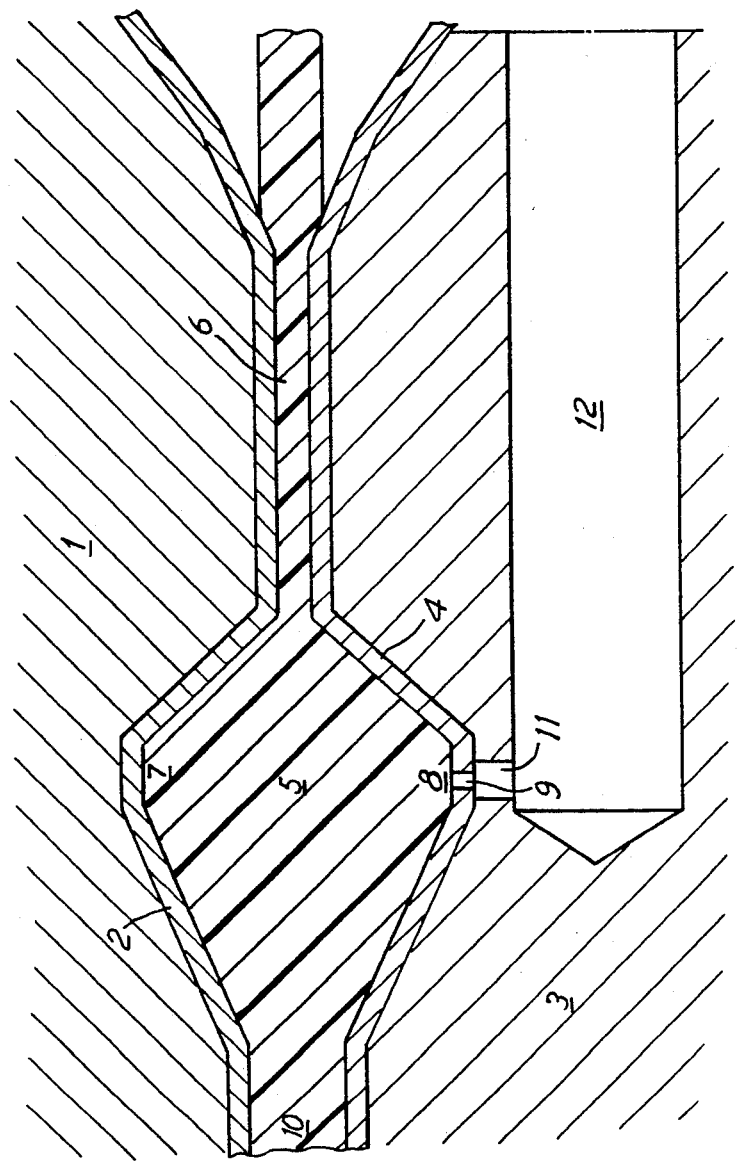

DISC RECORD PRESS FORMING

This invention relates to press forming of disc records, and more especially although not exclusively, to video disc records.

A shot of thermoplastics material can be placed between two faces of a press tool and caused to flow by utilization of temperature and pressure, a disc record being formed. Typically, the press tool faces have stamper plates affixed thereto, which plates carry a negative impression of the information to be pressed into the surface of the disc.

Regarding video discs, a ridge can be required to encircle the disc information region, if removal of the disc from a sealed container involves clamping and dragging the disc therefrom. The ridge need not be large to fulfil this function, it need only be sufficiently large to be engaged on removal; therefore any gaps in the ridge formed during production of the disc can produce malfunction of a device arranged to carry out said removal. The gaps can form if air is trapped within the press tool when it closes to cause the thermoplastics material to flow into the required disc shape, the air being contained in the region of the press tool forming the ridge.

It is an object of this invention to provide an improved disc record press tool whereby the likelihood of gas pocket production during press forming is reduced. According to one aspect of the invention there is provided a record press, for the press forming of disc records, including a pair of jaws and a press tool, said press tool comprising a pair of backing plates with stamper plates affixed thereto, said press tool being mounted between said pair of jaws such that, when said press is closed, said stamper plates face one another to form a disc record shaped cavity and, in use, said record press acts on a shot of plastics material to form a disc record surrounded by flash, said press tool having a number of apertures facing said cavity and vented to atmosphere such that, in use, air present in the vicinity of said apertures is permitted to escape therethrough, wherein said cavity is shaped such that an annular ridge of plastics material encircles the information region of a disc record formed by said press tool, and said apertures are positioned in an annular recess adjacent to said annular ridge such that air present in said annular ridge may escape therethrough.

In a preferred embodiment the apertures open onto a circumferential ring of said cavity and are sized to prevent escape therethrough of thermoplastics material utilized in said production. Preferably the apertures opening onto the cavity are linked to larger apertures forming part of the tool.

For a better understanding of the present invention and to illustrate how the same may be carried into effect reference will now be made, by way of example only, to the accompanying drawing, the single FIGURE of which illustrates part of a section through a press tool in accordance with the invention.

Referring to the drawing, a press tool suitable for production of a disc record requiring a ridge to encircle the information region of the record comprises an upper backing plate 1 having affixed thereto an upper stamper plate 2. The tool also includes a lower backing plate 3 having affixed thereto a lower stamper plate 4.

As is known in the art, the above tool is mounted between the jaws of a press such that when the press is closed a disc shaped cavity is produced. The FIGURE illustrates a section in the region of the cavity adapted to produce the above-mentioned ridge. Typically a shot of thermoplastics material is placed at the centre of the tool and by utilization of temperature and press pressure the shot is squeezed to fill the disc shaped cavity to produce an information region 10, a ridge 5 and flash 6, the latter being trimmed in a further production stage.

When thermoplastics material is squeezed between the two stamper plates, air may become entrapped within recessed rings 7 and 8 in the stamper plates, which rings define the ridge 5 in the closed tool. Consequently, the above-mentioned gaps can occur in the ridge of the final disc record resulting in possible problems of engaging the ridge as mentioned hereinbefore.

To avoid this problem, apertures 9 are produced in the recessed ring 8, which apertures are sized to allow release of air but to prevent escape of thermoplastic material therethrough, for example apertures having a diameter of 0.05 mm. These apertures can be accurately produced by laser drilling for example. Typically they are produced on an indexed table having 24 stops, therefore 24 apertures or less can be produced. To permit easier release of air from the recessed ring 8, the aperture 9 in the stamper plate is arranged to open onto a larger aperture 11 in the backing plate, which larger aperture is linked to a manifold 12 connected to atmosphere, the larger aperture can have a diameter of 0.4 mm and the manifold a diameter of 2 mm.

A number of aligned apertures 9 and 11 can be arranged to encircle the recessed ring 8 to ensure that during production no air is entrapped to produce the consequent gaps in the ridge 5. Any convenient number of apertures can be chosen, and they can be sited in either or both of recessed rings 7 and 8.

By utilization of a press tool in accordance with the invention, entrapped air is released from the disc shaped cavity defined by the press tool in a closed position allowing thermoplastics material to assume fully the cavity shape.

It will be understood that the embodiment illustrated shows an application of the invention in one form only for the purposes of illustration. In practice the invention may be applied to many different configurations, the detailed embodiment being straight forward for those skilled in the art to implement.

I claim:

1. A record press, for the press forming of disc records, including a pair of jaws and a press tool, said press tool comprising a pair of backing plates with stamper plates affixed thereto, said press tool being mounted between said pair of jaws such that, when said press is closed, said stamper plates face one another to form a disc record shaped cavity and, in use, said record press acts on a shot of plastics material to form a disc record surrounded by flash, said press tool having a number of apertures facing said cavity and vented to atmosphere such that, in use, air present in the vicinity of said apertures is permitted to escape therethrough, wherein said cavity is shaped such that an annular ridge of plastics material encircles the information region of a disc record formed by said press tool, and said apertures are positioned in an annular recess adjacent to said annular ridge such that air present in said annular ridge may escape therethrough.

2. A record press according to claim 1, wherein said apertures facing said cavity are dimensioned such that, in use, passage of air therethrough is permitted but passage of molten plastics material therethrough is not permitted.

3. A record press according to claim 1, wherein the record press is suitable for the forming of video disc records.

4. A record press according to claim 1, wherein at least one of said backing plates and its associated stamper plate have a number of apertures positioned such that, in use, said apertures in said stamper plate align with said apertures in said backing plate.

5. A record press according to claim 1, wherein said apertures lead to a manifold which communicates with atmosphere.

* * * * *